United States Patent [19]

Chenot et al.

[11] Patent Number: 5,188,763

[45] Date of Patent: Feb. 23, 1993

[54] METHOD FOR PREPARING ZINC ORTHOSILICATE PHOSPHOR

[75] Inventors: Charles F. Chenot, Towanda; Henry B. Minnier, Dushore, both of Pa.

[73] Assignee: GTE Products Corporation, Danvers, Mass.

[21] Appl. No.: 865,732

[22] Filed: Apr. 9, 1992

Related U.S. Application Data

[60] Division of Ser. No. 762,153, Sep. 17, 1991, abandoned, which is a continuation of Ser. No. 662,335, Feb. 25, 1991, abandoned, which is a continuation of Ser. No. 587,587, Sep. 24, 1990, abandoned, which is a continuation of Ser. No. 902,265, Aug. 29, 1986, abandoned.

[51] Int. Cl.$^5$ .................. C09K 11/59; C09K 11/68
[52] U.S. Cl. ........................... 252/301.5; 252/301.6 F
[58] Field of Search .................. 252/301.5, 301.6 F

[56] References Cited

U.S. PATENT DOCUMENTS

| | | | |
|---|---|---|---|
| 2,109,984 | 3/1938 | Aicher | 91/70 |
| 2,129,096 | 9/1938 | Leverenz | 252/301.6 F |
| 2,206,280 | 7/1940 | Froelich | 250/81 |
| 2,210,087 | 8/1940 | Leverenz | 250/81 |
| 2,222,509 | 11/1940 | Isenberg | 250/81 |
| 2,241,939 | 5/1941 | Aschermann et al. | 250/81 |
| 2,245,414 | 6/1941 | Roberts | 250/81 |
| 2,247,192 | 6/1941 | Fonda | 250/81 |
| 2,309,676 | 2/1943 | Schmidling | 176/122 |
| 2,457,054 | 12/1948 | Levevenz | 252/301.6 F |
| 2,554,999 | 5/1951 | Merrill et al. | 252/301.6 F |
| 2,656,320 | 10/1953 | Nagy et al. | 252/301.6 F |
| 3,114,067 | 12/1963 | Henderson | 313/109 |
| 3,157,602 | 11/1964 | Ropp | 252/301.6 F |
| 3,416,019 | 12/1968 | Kaduk | 313/109 |
| 3,535,267 | 10/1970 | Sarver | 252/301.6 F |
| 3,939,377 | 2/1976 | Ignasiak | 313/468 |
| 4,208,448 | 6/1980 | Panaccione | 427/67 |
| 4,315,190 | 2/1982 | Peters et al. | 313/467 |
| 4,390,449 | 6/1983 | Peters et al. | 252/301.6 F |
| 4,551,397 | 11/1985 | Yaguchi et al. | 428/691 |
| 4,585,673 | 4/1986 | Sigai | 427/213 |
| 4,728,459 | 3/1988 | Fan et al. | 252/301.6 F |
| 4,892,757 | 1/1990 | Kasenga et al. | 252/301.6 F |
| 4,925,703 | 5/1990 | Kasenga et al. | 252/301.4 F |
| 4,956,202 | 9/1990 | Kasenga et al. | 252/301.4 F |
| 5,039,449 | 8/1991 | Peters et al. | 252/301.6 F |

OTHER PUBLICATIONS

N. M. Korablev et al., "Kinetics of Formation of a Phosphor Based on Zinc Orthosilicate", J. Applied Chem. of U.S.S.R., 52(a), Part I, 1855–1859 (1979).

(List continued on next page.)

Primary Examiner—Jack Cooper
Attorney, Agent, or Firm—Robert E. Walter

[57] ABSTRACT

A manganese-activated zinc orthosilicate phosphor having the empirical formula:

$$Zn_{(2.00-x-y)}Mn_xSiO_{(4.00-y)}(WO_3)_z$$

wherein:
  $0.04 \leq x \leq 0.15$;
  $0 \leq y \leq 0.05$; and
  $0 \leq z \leq 0.002$ is provided. A method for preparing the above described phosphor is also disclosed. The method comprises blending a method for preparing manganese-activated zinc orthosilicate phosphor having the empirical formula:

$$Zn_{(2.00-x-y)}Mn_xSiO_{(4.00-y)}(WO_3)_z$$

wherein:
  $0.04 \leq x \leq 0.15$;
  $0 \leq y \leq 0.05$; and
  $0 \leq z \leq 0.002$;

the method comprising: blending a zinc source, a manganese (II) source, a silicon source, and a tungsten source in amounts in accordance with the formula together with up to about 2 weight percent NH$_4$Cl and up to about 0.2 weight percent NH$_4$F to form a relatively uniform admixture; firing the admixture in a closed container under an inert atmosphere to form the phosphor; milling and washing the phosphor in an aqueous citric acid solution; and rinsing the citric acid washed phosphor with ammonium hydroxide. A low pressure mercury arc discharge device including the above-described phosphor is still further disclosed.

5 Claims, 4 Drawing Sheets

OTHER PUBLICATIONS

D. E. Harrison, "Relation of Some Surface Chemical Properties of Zinc Silicate Phosphor to its Behavior in Fluorescent Lamps", J. Electrochem. Soc. 107 (3), 210-217 (1960).

Takamri et al., "Phase Transitions and Thermoluminescence of a Plasma-Sprayed Zinc Silicate Phosphor," Comm. of American Ceramic Society, C-127 et seq., Aug. 1983.

E. F. Lowrey, "The Long-Term Deterioration in Cerain Phosphors Exposed to the Low Pressure Mercury Arc", Trans. Electrochem. Soc. 95(5), 242 (1949).

Leverenz, "Synthesis of Luminescent Solids (Phosphors)-Syntheses and Symbolism of Phosphors", pp. 68-69.

Leverenz, "Solid (Crystals)—Growth of Real Crystals", pp. 48-49.

Uehara et al., "A Study of Fluorescent Substances (The 8th report)-in a Fluorescent Spectrum of $ZnO-SiO_2$ Group Fluorescent Materials", J. Chem. Soc. Japan 61, 907-918 (1940).

Hurd et al., "J. of Vacuum Science & Technology", vol. 13, No. 1 pp. 410-413 (1976).

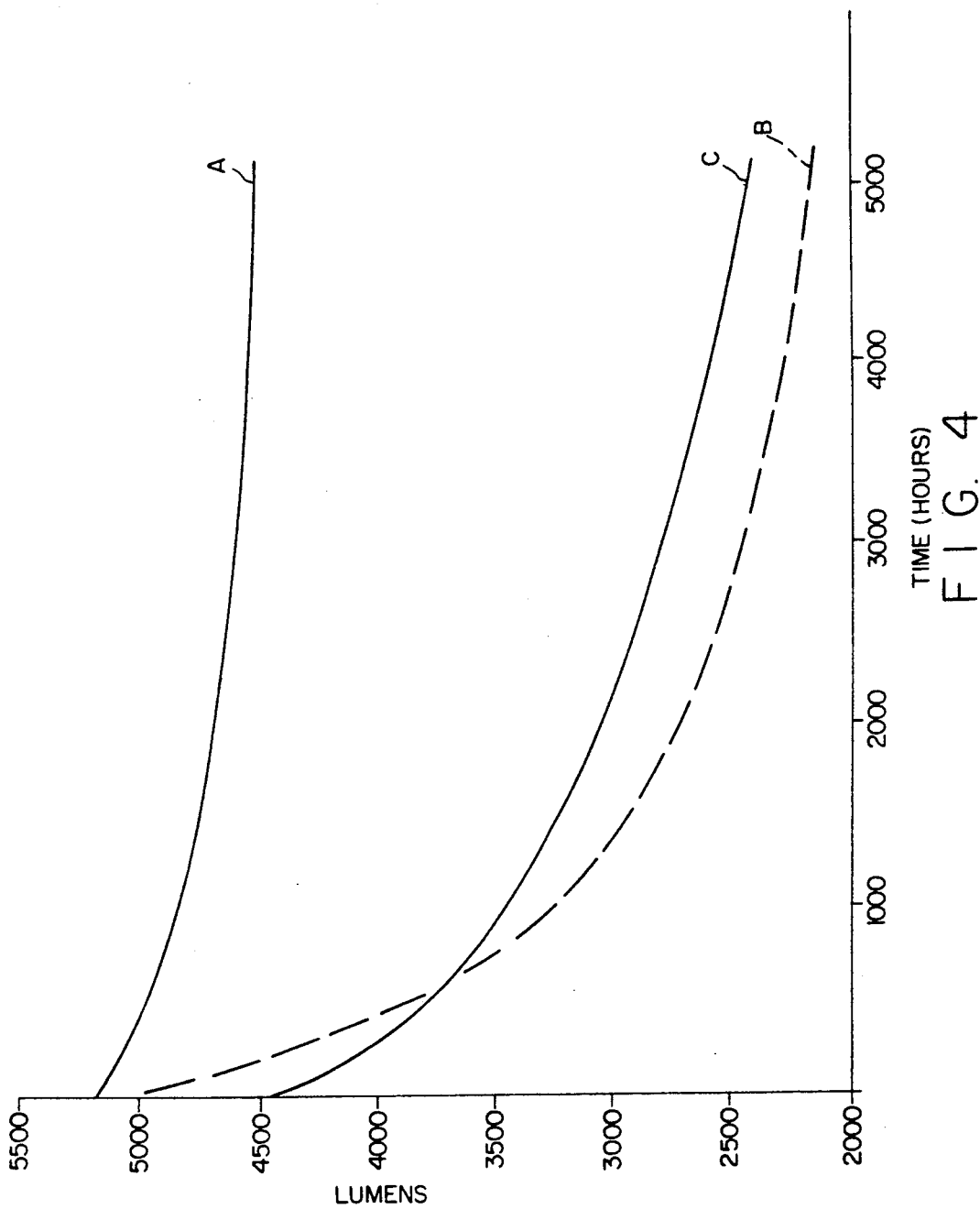

METHOD FOR PREPARING ZINC ORTHOSILICATE PHOSPHOR

This is a divisional of copending app. Ser. No. 07/762,153, filed on Sep. 17, 1991, which is a continuation of Ser. No. 07/662,335, filed Feb. 25, 1991, which is a continuation of Ser. No. 07/587,587, filed Sep. 24, 1990, which is a continuation of Ser. No. 06/902,265, filed Sep. 29, 1986, all now abandoned.

CROSS REFERENCE TO RELATED APPLICATION

This application is related to the application of C. F. Chenot. H. B. Minnier, F. R. Taubner and A. G. Sigai for "Phosphor Particle Phosphor Blend and Fluorescent Lamp" filed on even date herewith.

BACKGROUND OF THE INVENTION

This invention is concerned with manganese-activated zinc orthosilicate phosphor $Zn_2SiO_4:Mn$. The phosphor emits in the green region of the visible spectrum and is used, for example, in fluorescent lamps and cathode ray tubes. $Zn_2SiO_4:Mn$ is disclosed in U.S. Pat. Nos. 2,109,984; 2,206,280; 2,210,087; 2,222,509; 2,241,939; 2,245,414; 2,247,142; 2,544,999; and 3,416,019.

One of the problems associated with $Zn_2SiO_4:Mn$ is its relatively poor fluorescent lamp performance and maintenance. Poor maintenance means that the light output, or lumens per watt, of the phosphor decreases to a greater extent during lamp life than is desirable. This invention is concerned with manganese-activated zinc silicate phosphor having improved fluorescence efficiency.

The manufacturing of the phosphor material manganese-activated zinc orthosilicate (also referred to as willemite) for fluorescent lamp applications typically involves reaction among components formulated with a significant nonstoichiometric excess of silicon dioxide or silicic acid. Heretofore, excess silica ($SiO_2$) has been deemed necessary to achieve efficient and complete, or nearly complete, incorporation of the high activator dopant concentration levels of the $Mn^{++}$ ion typically used in the phosphor. See, for example, U.S. Pat. No. 2,245,414. Such synthesis procedures, however, are often plagued by incomplete blending, typically caused by the poor dispersion characteristics of the ZnO or $ZnCO_3$ components. Known synthesis procedures also result in some manganese losses. Manganese losses are associated with high vapor pressure of some manganese intermediate compounds; incomplete or improper incorporation of the manganous ion (caused by the variety of oxidation states of manganese); plus other thermodynamic considerations. Existing synthetic procedures for this phosphor also result in variable particle size development.

In fluorescent lamps, willemite phosphors manufactured by these known methods exhibit a faint tan or yellow discoloration, relatively high lamp depreciation (or poor lamp life), and overall low quantum efficiency, which is a result of sensitivity to lamp manufacturing plus the lamp depreciation factor.

One method for achieving a white bodied manganese-activated zinc silicate phosphor without requiring excess silica is described in U.S. Pat. No. 3,416,019. However, this patent shows the addition of $MgF_2$ to be essential for achieving a white bodied phosphor.

The importance of high-performance, green-emitting phosphors with low depreciation characteristics in fluorescent lamps has increased in recent years with the growing demand for high CRI performance lamps. For that reason, in particular, an improved manganese-activated zinc orthosilicate phosphor and an improved method for preparing manganese-activated zinc orthosilicate phosphor would represent a significant advancement in the art.

SUMMARY OF THE INVENTION

In accordance with one aspect of the present invention, there is provided manganese-activated zinc orthosilicate phosphor having the empirical formula:

wherein:
$0.04 \leq x \leq 0.15$;
$0 \leq y \leq 0.05$; and
$0 \leq z \leq 0.002$.

In accordance with another aspect of the present invention, there is provided a method for preparing manganese-activated zinc orthosilicate phosphor having the empirical formula:

wherein:
$0.04 \leq x \leq 0.15$;
$0 \leq y \leq 0.05$; and
$0 \leq z \leq 0.002$.

The method of he present invention comprises blending a zinc source, a manganese (II) source, a silicon source, and a tungsten source in amounts in accordance with the formula, up to about 2 weight percent $NH_4Cl$ and up to about 0.2 weight percent $NH_4F$ to form a relatively uniform admixture; firing the admixture in a closed container under an inert atmosphere for a period of time and at a temperature sufficient to form the phosphor, and milling and washing the phosphor in an aqueous citric acid solution.

In accordance with still a further aspect of the present invention there is provided a low pressure mercury arc discharge device comprising a vitreous envelope having electrodes sealed into its ends, a fill of inert gas at a low pressure, a small quantity of mercury, and a coating on the inner surface of the vitreous envelope, said coating comprising one or more phosphor layers wherein at least one phosphor layer comprises manganese-activated zinc orthosilicate phosphor having the empirical formula:

wherein:
$0.04 \leq x \leq 0.15$
$0 \leq y \leq 0.05$
$0 \leq z \leq 0.002$

BRIEF DESCRIPTION OF THE DRAWINGS

Figure 1:
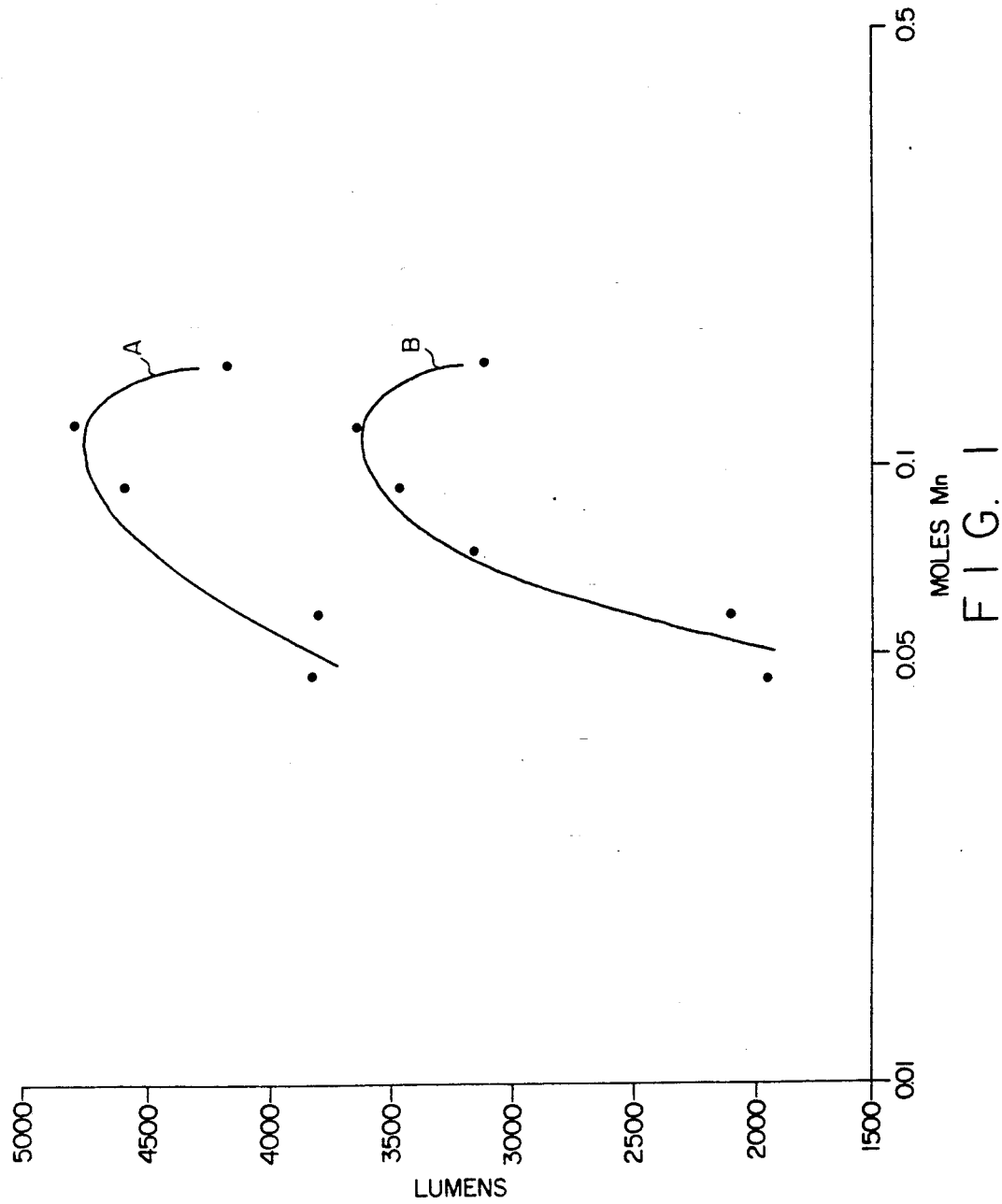

IN THE DRAWINGS:

FIG. 1 graphically represents lumen output for a lamp including a phosphor composition in accordance with the present invention as a function of manganese content (moles) at zero hours and after 100 hours of lamp operation.

Figure 2:
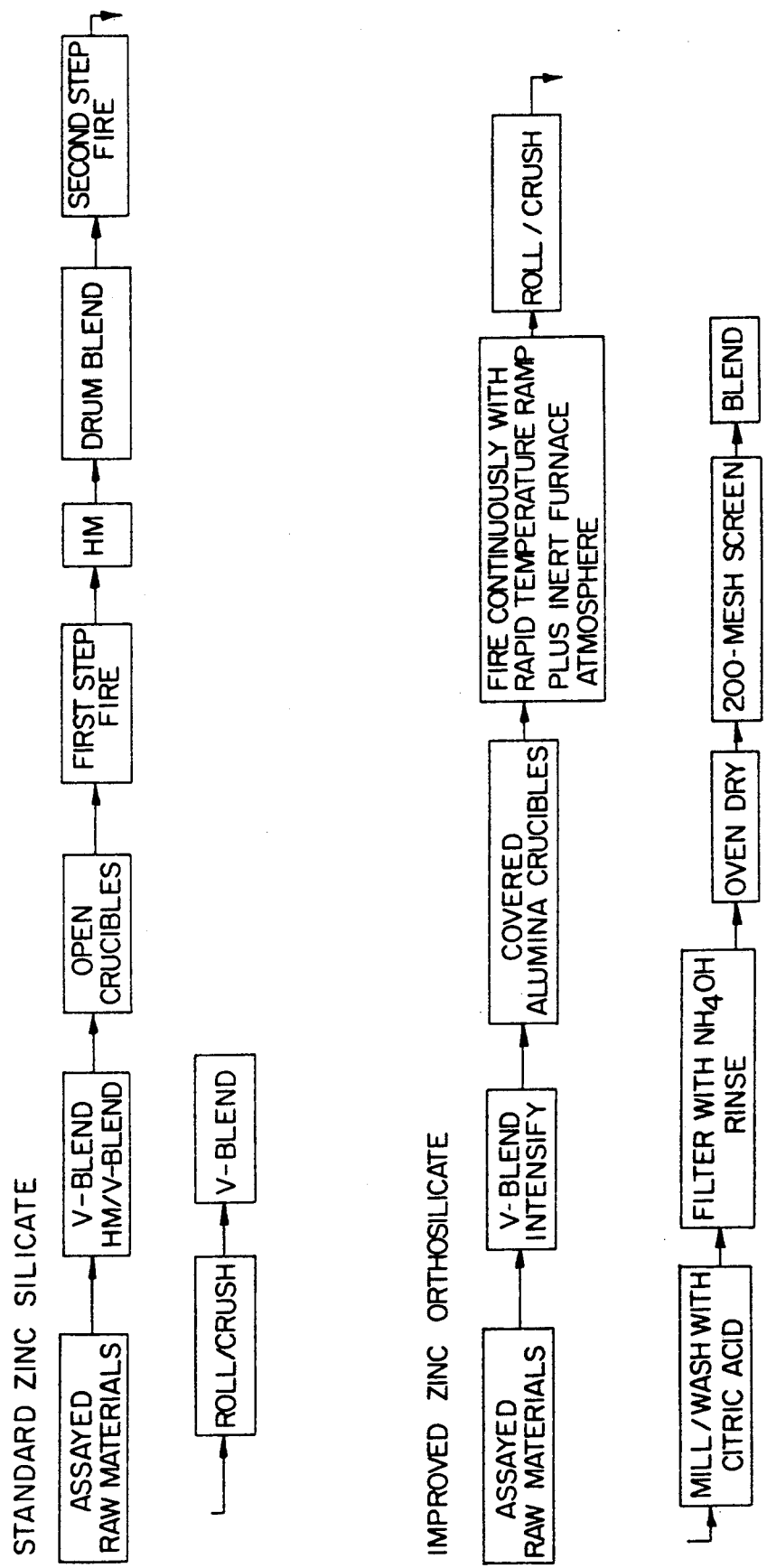

FIG. 2 compares the standard procedure for preparing standard manganese-activated zinc orthosilicate phosphor with one embodiment of the method of the present invention for preparing substantially stoichiometric manganese-activated zinc orthosilicate phosphor.

Figure 3:
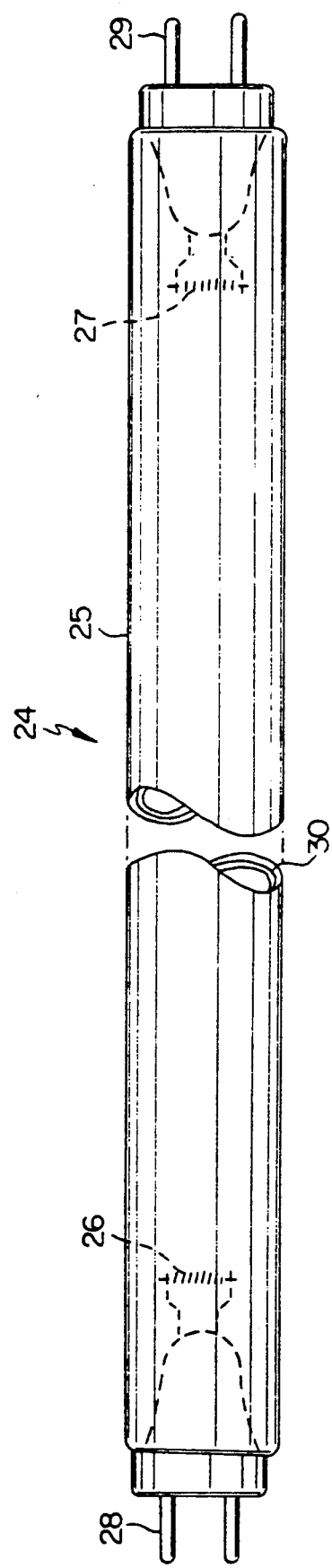

FIG. 3 is a diagrammatic elevational view of a lamp.

FIG. 4 graphically represents lumen output as a function of lamp operational time for lamps incorporating a phosphor composition in accordance with the present invention and a lamp incorporating standard manganese-activated zinc orthosilicate phosphor.

For a better understanding of the present invention, together with other and further objects, advantages, and capabilities thereof, reference is made to the following disclosure and appended claims in connection with the above described drawings.

DETAILED DESCRIPTION OF THE INVENTION

In accordance with the present invention, it has been found that the most important feature for lamp applications concerning the synthesis of high-performance manganese-activated zinc orthosilicate, or willemite, is complete incorporation of high dopant levels of the activator ion $Mn^{++}$. Although zinc silicate exhibits a rather high solubility for $Mn^{++}$ ions in solid solution, competition, in terms of thermodynamic equilibrium, between $Mn^{++}$ entering a $Zn^{++}$ site vacancy and $Mn^{++}$ remaining as a second phase oxide or mixed oxide impurity is apparent from the presence of trace amount of unreacted $Mn^{++}$ in the phosphor. This occurs in spite of relatively high excess silica content (nonstoichiometry), which is intended to provide more availability of $Zn^{++}$ site vacancies for enhancement of $Mn^{++}$ incorporation. Most conventional procedures for willemite phosphor synthesis, although providing for more than adequate $Zn^{++}$ site vacancies, do not provide for adequate oxygen venting or purging of the synthesis mixture during the early, critical phases of the firing step. This gives rise to some limited oxidation of the $Mn^{++}$ to higher oxidation state oxides, which appear more difficult to incorporate properly in the willemite material and also contribute to the mixed oxide second phase mentioned earlier.

Solid state synthesis reactions, which are typically used to prepare inorganic phosphors, involve thermal diffusion mechanisms, which are typically time consuming reactions. Such procedures also provide adequate time for oxidation side reactions, especially if such procedures are not protected from the atmosphere. The present invention involves the use of ammonium halide salts, namely, ammonium chloride and ammonium fluoride, admixed into substantially stoichiometric formulations of Mn-doped mixtures of zinc oxide or zinc oxide-forming precursor compounds, such as zinc carbonate, and finely divided (bulky) silica or $SiO_2$-forming precursors, such as silicic acid. Examples of suitable $Mn^{++}$ sources include MnO and $MnCO_3$. The role of these ammonium halide additions can be defined in terms of the following functions: (1) to vent or purge the formulation, placed in a covered firing vessel or crucible, free of residual air or oxygen; (2) to react with the $Mn^{++}$ rendering component to form local partial pressures of manganous ($Mn^{++}$) halide or mixed halide; (3) to provide for controlled variation in the resulting phosphor particle size and size distribution characteristics; and (4) to create particle morphology and size features that permit easy dispersion during the preparation of lamp coating solutions.

The first of these features is essential to preserving the $Mn^{++}$ ion as a divalent ion. Sequestering the manganese as $Mn^{++}$ decreases the possible formation of higher valent manganese cations, which can interfere with the desired reactivity. In the second feature, the creation of local vapor pressure provides an important "vapor transport mechanism" which greatly enhances distribution, reactivity, and incorporation of the $Mn^{++}$ dopant ions. This vapor diffusion feature greatly reduces the reaction time necessary to create the phosphor; thus, manufacturing efficiency is significantly improved. This second feature is most effectively achieved with the chloride salt. The third feature provides a means for achieving some intentional design variation in particle size characteristics and is most effectively achieved with the fluoride salt in combination with the chloride salt. Even at quite low concentration additions, substantial particle growth is realized by strategic additions of the fluoride salt. Finally, the fourth feature, in combination with a "mill wash" procedure, creates a phosphor with highly desirable "stir-in" features, which contribute to improved lamp coating procedures and improved lamp coating texture.

The synthesis of the improved willemite of the present invention is dominated by a substantially stoichiometric formulation; a predetermined admix of $NH_4Cl$ and $NH_4F$ salts at a ratio adjusted to achieve the desired particle growth and clarity (definition); a closed container, for example, an alumina crucible fitted with a relatively tightly fitted alumina lid, or similar closed refractory reaction vessel; a single step heat treatment in an inert gas furnace atmosphere; and a final mill-/wash treatment of the phosphor in a weak citric acid.

Preferably, the single step heat treatment includes a rapid heat-up profile. While not wishing to be bound by theory, it is believed that a rapid heat-up profile promotes and assists the proposed vapor transport mechanism of the present method. Advantageously the heat-up profile should be sufficiently fast for reaction to occur between the reactants in the gaseous state. If the heat-up profile is too slow, the gaeous reactants may dissipate from, or leave the reaction vessel before the desired reaction occurs. If, alternatively, the heat-up profile is too fast, the reaction container may undergo structural deterioration, such as, cracking, and the like. Preferably, the heat-up time for a temperature increase of, for example, from 700 to 1250° C., is in the range of from about 30 minutes to about 1 hour.

In other words as used herein a rapid heat-up profile calls for heating the reactants within the closed container at a temperature rate sufficient for reaction to occur between the gaseous reactants before gaseous reactants diffuse out of the closed container.

The white-bodied substantially stoichiometric manganese-activated zinc orthosilicate phosphor composition of the present invention includes the following elements in the specified weight percent ranges:

zinc, from about 54.06% to about 57.60% by weight;
silicon, from about 12.60% to about 12.93% by weight;
manganese, from about 0.98% to about 3.79% by weight;
tungsten, from about 0% to about 0.169% by weight; and oxygen.

The oxygen content is determined by difference and is from about 28.76% to about 29.10% by weight (by difference).

The phosphor of the present invention can be defined and identified by its cation composition. The cation composition of the substantially stoichiometric manganese-activated zinc orthosilicate phosphor composition of the present invention comprises:
- a zinc concentration from about 54.06% to about 57.60% by weight;
- a silicon concentration from about 12.60% to about 12.93% by weight.
- a manganese concentration from about 0.98% to about 3.79% by weight, and
- a tungsten concentration from about 0% to about 0.169% by weight.

The term "cation", as used to describe elements present in the phosphor composition of the present invention, means the elements present in the phosphor composition of the present invention other than oxygen.

These compositional limits can also be defined in terms of the empirical formula:

$$Zn_{(2.00-x-y)}Mn_xSiO_{(4.00-y)}(WO_3)_z$$

wherein:
$0.04 \leq x \leq 0.15$
$0 \leq y \leq 0.05$
$0 \leq z \leq 0.002$.

In the formulation, the nonstoichiometry parameter (y) has been limited to only a small deviation from the ideal stoichiometry of $(Zn+Mn)/Si=2.00$, i.e., from 1.95/1 to 2.00/1 At the prescribed upper limit of $Y=0.05$, the amount of excess silica ($SiO_2$) computes to less than 0.7 weight percent, which is a reasonable tolerance keeping the negative feature of excess silica to a minimum. As used herein, "substantially stoichiometric" describes a phosphor in which the nonstoichiometry parameter y is greater than or equal to zero and less than or equal to 0.05. Preferably, the nonstoichiometry parameter (y) is greater than or equal to zero and less than or equal to 0.03. Most preferably, y equals zero, signifying the ideal stoichiometry of $(Zn+Mn)/Si=2.00$.

Tungsten, in the form of $WO_3$, can optionally be incorporated into the zinc silicate phosphor of the present invention. The $WO_3$ addition is represented by the parameter z in the empirical formula. The amount of $WO_3$ per formula unit is greater than or equal to zero and less than or equal to 0.002 mole.

The manganese concentration (x) is varied over a range of from about 0.04 to about 0.15 moles per formula unit, which range includes the concentration resulting in optimum luminescence performance. Optimum luminescence has been demonstrated for phosphor compositions in which x is from about 0.11 to about 0.12 by intrinsic powder fluorescence evaluation and by actual lamp evaluation in 40 Watt T12 fluorescent lamps, as shown in FIG. 1.

FIG. 1 shows lumen output as a function of moles of manganese per phosphor formula unit at zero hours of operation (curve A) and at 100 hours of operation (curve B).

Except for the manganese contents, which were in accordance with the values reported in Table I, the phosphor compositions used to obtain the data reported in Table I were otherwise formulated and prepared by a method similar to the method described in Example III.

In Table I, comparison is made between the calculated weight % Mn concentration for the Mn concentration series of FIG. 1 and the actual Mn concentration determined by postfiring quantitative analysis. The close parallel of these data indicates that the final composition is accurately represented by the empirical formula.

TABLE I

| Value of x | Calculated wt % Mn | Analyzed wt % Mn |
|---|---|---|
| 0.0457 | 1.13 | 1.2 |
| 0.0575 | 1.42 | 1.5 |
| 0.0724 | 1.79 | 1.7 |
| 0.0911 | 2.26 | 2.2 |
| 0.1147 | 2.84 | 2.8 |
| 0.1444 | 3.58 | 3.5 |

The empirical formula of a preferred phosphor composition in accordance with the present invention is one in which $0.11 \leq x \leq 0.12$, $0 \leq y \leq 0.03$, and $z=0.001$.

The above-described preferred phosphor composition comprises the following cation composition:
- zinc, from about 55.13 to about 55.68 percent by weight;
- manganese, from about 2.72 to about 3.01 percent by weight;
- silicon, from about 12.66 to about 12.81 percent by weight; and
- tungsten, from about 0.0828 to about 0.0838 percent by weight.

The oxygen content of the above-described preferred composition, determined by difference, is from about 28.86 to about 28.97 percent by weight.

In accordance with the method of the present invention, the improvements realized have been achieved by use, in the preparation of the phosphor, of strategic amounts of ammonium halide salts, namely, ammonium chloride ($NH_4Cl$) and ammonium fluoride ($NH_4F$), in combination with covered refractory reaction vessels and an inert furnace atmosphere. Preferably, a slow dynamic flow of nitrogen gas is employed in the furnace, e.g., a linear flow rate from 0.2 to 0.5 liters nitrogen per minute per cm² (i.e. from 200 to 500 cm/min.)

While not wishing to be bound by theory, the reaction mechanism involving ammonium halide salts is believed to promote and assist the formation of an $MnSiO_3$ intermediate via a vapor transport mechanism as demonstrated below:

$$1.9\ ZnO + SiO_2 \cdot xH_2O + 0.1\ MnCO_3 \longrightarrow (Zn, Mn)_2SiO_4 \quad (1)$$

$$ZnO + SiO_2 \cdot xH_2O + MnCO_3 \longrightarrow \quad (2)$$

SOLID STATE DIFFUSION $$ZnO + MnSiO_3 + SiO_2 \longrightarrow (Zn, Mn)_2SiO_4$$

$$ZnO + SiO_2 \cdot xH_2O + MnCO_3 + NH_4Cl \longrightarrow ZnO + \quad (3)$$

VAPOR TRANSPORT $$MnCl_{2(g)} + SiO_2 \rightleftharpoons ZnO + MnSiO_3 + SiO_2 \longrightarrow$$

$$(Zn, Mn)_2SiO_4$$

-continued

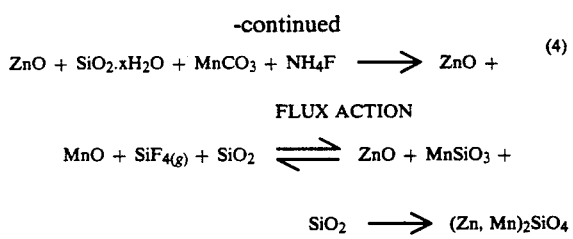

Equation (1) represents the overall reaction for formation of a phosphor in accordance with the present invention. Equations (2)-(4) demonstrate the steps of the reaction mechanism involved in the instant method. (Equations (2)-(4) are not balanced.)

In accordance with the reaction mechanism of the present invention, the ammonium halide additions perform various functions. The ammonium chloride and ammonium fluoride purge the crucible load of air and/or $O_2$, thereby preserving manganese as a divalent ion. The ammonium chloride causes rapid vapor transport of Mn; enhances the overall reaction, maintains the divalent Mn ion; and causes limited particle growth or fluxing action. The ammonium fluoride causes some vapor transport of manganese and severe fluxing action, resulting in significant particle growth. The use of ammonium chloride in combination with very small amounts of ammonium fluoride provides controlled particle growth with high reactivity.

The concentration range of the ammonium halide additions to the unfired formulations in accordance with the method of the present invention, are summarized as follows:

$$0 < \text{wt } \% \text{ NH}_4\text{Cl} \leq 2.000$$

$$0 < \text{wt } \% \text{ NH}_4\text{F} \leq 0.2$$

Amounts of $NH_4Cl$ from about 0.5 to about 1.0 and of $NH_4F$ from about 0.02 to about 0.06 are considered optimum to achieve high-performance zinc silicate phosphor with a preferred particle size in the range of $5 \leq FSSS \leq 6$. (FSSS is the abbreviation for Fisher Sub-Sieve Size: FSSS units are designated in micrometers.)

Examples of the particle size variation and control as a function of the ammonium halide additions are shown in Table II. (With the exception of the amounts of $NH_4Cl$ and $NH_4F$ which were in accordance with the amounts reported in Table II, the phosphor compositions of Samples C, E, and F were otherwise formulated and prepared by a method similar to that described in Example III.)

TABLE II

| Sample | Wt % NH$_4$Cl | Wt % NH$_4$F | Typical Particle Size (FSSS) |
|---|---|---|---|
| A | 0.5 | 0 | 2.5-3.0 without W |
| B | 0.5 | 0 | 3.6-5.2 with W |
| C | 0.475 | 0.025 | 6.0 with W |
| D | 0.45 | 0.05 | 6.7 with W |
| E | 0.40 | 0.10 | 8.7 with W |
| F | 0.35 | 0.15 | 8.7 with W |

The general procedure for preparing improved manganese-activated zinc silicate phosphor in accordance with the present invention can be better understood by reference to FIG. 2 which compares the conventional method for preparing standard zinc orthosilicate phosphor with the method of the present invention.

The following Examples are given to enable those skilled in this art to more clearly understand and practice the present invention. These examples should not be considered as a limitation upon the scope of the invention but merely as being illustrative and representative thereof.

EXAMPLE I

This example is directed to the preparation of improved manganese-activated zinc orthosilicate, as represented by Sample A in Table II, employing $NH_4Cl$ as the only ammonium halide addition to the starting formulation.

The following starting materials were used in the present example. The relative mole amounts (i.e., the moles per formula unit) and corresponding numbers of grams per batch for each of the starting materials are as follows:

|  | Rel. Moles | g/batch |
|---|---|---|
| Zinc Oxide | 1.8852 | 153.40 |
| Silicic Acid (approx. 87% SiO$_2$) | 1.000 | 69.35 |
| MnCO$_3$ (approx. 47% Mn) | 0.1147 | 13.34 |
| NH$_4$Cl | 0.0221 | 1.180 |

These raw materials were thoroughly blended and fired in covered alumina crucibles in a furnace programmed to ramp from about 700° C. to about 1250° C. within 30 minutes, hold at about 1250° C. for about 2-3 hours, and ramp down to about 700° C. in about 60 minutes.

The fired material was then subjected to a mill/wash treatment where the material was ball milled in a weak citric acid solution (about 0.2% citric acid (HO(CH$_2$CO$_2$H)$_2$CO$_2$H) per unit of phosphor powder) for about 30 minutes to 1 hour. The mill/washed material was then dewatered and dried.

EXAMPLE II

This example is directed to the preparation of improved manganese-activated zinc orthosilicate, as represented by Sample B in Table II, including WO$_3$ and employing NH$_4$Cl as the only ammonium halide addition to the starting formulation.

The following starting materials were used in the present example. The relative mole amounts (i.e., the moles per formula unit) and corresponding numbers of grams per batch for each of the starting materials are as follows:

|  | Rel. Moles | g/batch |
|---|---|---|
| Zinc Oxide | 1.8852 | 153.40 |
| Silicic Acid (approx. 87% SiO$_2$) | 1.0000 | 69.35 |
| MnCO$_3$ (approx. 47% Mn) | 0.1147 | 13.34 |
| NH$_4$Cl | 0.0221 | 1.180 |
| WO$_3$ | 0.0011 | 0.255 |

These materials were blended, fired and mill/washed in a manner similar to the procedure presented in Example I.

EXAMPLE III

This example is directed to the preparation of improved manganese-activated zinc orthosilicate as represented by Sample D in Table II involving WO$_3$, and employing both NH$_4$Cl and NH$_4$F as the ammonium halide additions to the starting formulation.

The following starting materials were used in the present example. The relative mole amounts (i.e., the moles per formula unit) and corresponding numbers of grams per batch for each of the starting materials are as follows:

|  | Rel. Moles | g/batch |
| --- | --- | --- |
| Zinc Oxide | 1.8852 | 153.40 |
| Silicic Acid (approx. 87% SiO$_2$) | 1.000 | 69.35 |
| MnCO$_3$ (approx. 47% Mn) | 0.1147 | 13.34 |
| NH$_4$Cl | 0.0199 | 1.062 |
| NH$_4$F | 0.0032 | 0.118 |
| WO$_3$ | 0.0011 | 0.255 |

These materials were blended, fired and mill/washed in a manner similar to the procedure presented in Example I.

EXAMPLE IV

This example is directed to the preparation of improved manganese-activated zinc orthosilicate similar to Sample D in Table II, involving WO$_3$, NH$_4$Cl and NH$_4$F, with the exception that the NH$_4$Cl addition is approximately doubled to accommodate larger scale crucibles and furnace equipment.

The following starting materials were used in the present example. The relative mole amounts (i.e., the moles per formula unit) and corresponding numbers of kilograms per batch for each of the starting materials are as follows:

|  | Rel. Moles | g/batch |
| --- | --- | --- |
| Zinc Oxide | 1.8852 | 30.68 |
| Silicic Acid (approx. 87% SiO$_2$) | 1.000 | 13.81 |
| MnCO$_3$ (approx. 47% Mn) | 0.1147 | 2.68 |
| NH$_4$Cl | 0.0438 | 9.469 |
| NH$_4$F | 0.0038 | 0.282 |
| WO$_3$ | 0.0011 | 0.054 |

These materials were blended, fired, and mill/washed in a manner similar to the procedure presented in Example I, except that the formulation is designed for larger scale firing procedures as, for example, a continuous furnace where the temperature time profile is analogous to the temperature ramp program indicated in Examples I, II and III.

A critical part of the phosphor preparation procedure of the present invention is the citric acid mill/wash step. Although the overall reaction mechanism is designed to achieve essentially complete Mn$^{++}$ incorporation, trace amounts of unreacted manganese may persist. The mill/wash procedure is designed to dissolve and sequester any unreacted manganese which could contribute to discoloration of the phosphor and lower emission if not removed. In addition, the mill/wash step is designed to help deaggregate particle clusters and reduce the material to its fundamental particle size. A preferred concentration range for citric acid for use in the mill/wash is from about 0.2 to 0.4 weight percent per unit of phosphor powder.

The advantages derived from the incorporation of WO$_3$ in combination with the acid mill wash is clearly shown by the results shown in Table III. Table III compares lamp test data, phosphor texture and particle size for a phosphor prepared from zinc oxide, silicic acid (approx 87% SiO$_2$), and manganese (II) carbonate in the following relative mole amounts of 1.8852, 1.0000, 0.1147, and 0.0221, respectively. In samples G and I, which contained tungsten, tungsten is added in the relative mole amount of 0.0011 moles. The starting material for samples G–J were blended and fired in a manner similar to the blending and firing steps described in Example I, and the fired material was suspended in a citric acid solution and gently agitated therein. Samples I and J were further processed via the citric acid mill wash step as described in Example I.

As used to describe texture in Table III, "poor" means an unacceptable mottled and/or spotty phosphor coating in a fluorescent lamp and "excellent" means an acceptable smooth, essentially blemish-free coating in a fluorescent lamp.

TABLE III

| SAMPLE | W | FSSS | TEXTURE | LUMENS AT 0 HOURS |
| --- | --- | --- | --- | --- |
| G | YES | 6.0 | POOR |  |
| H | NO | 5.2 | POOR | 3962 |
| I | YES | 5.2 | EXCELLENT | 5015 |
| J | NO | 5.0 | EXCELLENT | 4301 |

The lamps used to obtain the lumen data reported in Table III were 40-Watt T12 lamps.

A low pressure mercury arc discharge device in accordance with the present invention comprises a vitreous envelope having electrodes sealed into its ends, a fill of inert gas at low pressure, a small quantity of mercury, and a coating on the inner surface of the vitreous envelope. The coating comprises a phosphor in accordance with the present invention. The coating of the lamp may include one or more phosphor layers wherein at least one of the phosphor layers includes a phosphor in accordance with the present invention. Typical low pressure mercury lamps include fluorescent lamps. As used herein, the term "fluorescent lamp" refers to any lamp containing a phosphor excited to fluorescence by ultraviolet radiation, regardless of configuration.

Referring now to the drawing of FIG. 3 with greater particularity, there is shown in FIG. 3 an example of a fluorescent lamp 24 comprising a tubular, hermetically sealed, glass envelope 25. Electrodes 26 and 27 are sealed in the ends of envelope 25. Suitable terminals 28 and 29 are connected to the electrodes 26 and 27 and project from envelope 25. An arc generating and sustaining medium such as one or more inert gases and mercury vapor is included within envelope 25.

A coating 30 is applied to the inside surface of envelope 25. The coating 30 comprises one or more phosphor layers with at least one of the phosphor layers comprising the phosphor of the present invention.

The advantages associated with the phosphor of the present invention are further illustrated by the lamp performance of the phosphor when the particles are individually coated with a continuous protective coating. Individually and continuously coated phosphor particles are prepared by depositing a continuous, non-particulate, conformal, aluminum oxide coating on the outer surface of the individual phosphor particles. Such coating is applied by coating methods such as, for example, chemical vapor deposition or preferably chemical vapor deposition in a fluidized bed. Most preferably, the continuously coated individual phosphor particles are prepared by the method described in U.S. Pat. No. 4,585,673, entitled "Method for Coating Phosphor Particles" by A. Gary Sigai, which issued on Apr. 29, 1986, which is hereby incorporated herein by reference.

The following Example is given to enable those skilled in this art to more clearly understand and practice the present invention. The Example should not be considered as a limitation upon the scope of the invention but merely as being illustrative and representative thereof.

The particles of the phosphor of the present invention were individually and continuously coated with a nonparticulate, conformal continuous coating of alumina using the coating method described in U.S. Ser. No. 718,096, filed by A. Gary Sigai on May 3, 1985. (now U.S. Pat. No. 4,585,673) Prior to coating, the phosphor was admixed with a fluidizing aid, such as Aluminum Oxide C (manufactured by DeGussa Inc.) The admixture contained about 0.05 weight percent fluidizing aid with respect to the phosphor. Two hundred sixty grams of the admixture were loaded into the reactor. The coating method parameters were:

| | |
|---|---|
| Carrier Gas (N$_2$) | 500 cc/mm |
| Alkyl bubbler flow (N$_2$) | 150 cc/mm |
| Oxygen flow | 500 cc/mm |
| Oxygen Carrier (N$_2$) | 50 cc/mm |
| Hot zone (Highest temperature) | 500° C. |

The coating precursor material was trimethyl aluminum. The calculated alumina (Al$_2$O$_3$) coating thickness was about 100 Angstroms. The surface area of the uncoated phosphor was about 0.39 meter $^2$/gram, which is within the preferred range of 0.31–0.39 meters/gram. High resolution SEM of coated phosphor particles shows that the alumina coating is conformal. The coating growth was enhanced where fluidizing aid particles had adhered to the phosphor particle surface during fluidizing and the coating process. Auger analysis confirmed complete coverage of the surface of the individual phosphor particles with alumina. "Continuous", as used herein to describe the aluminum oxide coating herein, means nonparticulate, i.e., the aluminum oxide coating surrounding each phosphor particle does not consist of individual aluminum oxide particles.

The key features of the aluminum oxide coated phosphor particles of the present invention are: (1) the continuous, or nonparticulate, nature of the coating on each particle; (2) the conformal nature of the coating on each particle, replicating submicron features found naturally occurring on the uncoated phosphor particles; and (3) that each phosphor particle is individually coated.

These key features of the coated phosphor particle of the present invention are established and/or supported by Scanning Electron Microscopy (SEM). Auger analysis, reflection electron diffraction techniques and BET measurements.

Scanning electron microscopy of the coated particles shows that the particles are individually coated; that the aluminum oxide coating on the phosphor particles is continuous and does not consist of aluminum oxide particles; and that the coating is conformal, replicating the submicron features of the underlying phosphor particle.

Auger analysis indicates that the coating provides substantially complete coverage of the outer surface of the phosphor particle.

Reflection electron diffraction shows the aluminum oxide coating to be noncrystalline, i.e., amorphous.

BET measurements support the conformal and continuous nature of the aluminum oxide coating to the extent the surface area of the coated phosphor is not appreciably changed when compared to the surface area of the uncoated phosphor. If the coating were particulate in nature, the surface area of the coated phosphor would be significantly increased. BET measurements also support that the phosphor particles are individually coated.

The coated phosphor particles were incorporated into a 40 Watt T12 fluorescent lamp without conventional "milling", using wet-sieving techniques and an organic suspension system. The phosphor coating was applied to the inner surface of the lamp envelope and the lamp was otherwise processed using conventional lamp-processing techniques.

FIG. 4 graphically compares the lumen output for three 40 Watt T12 fluorescent lamps as a function of hours of lamp operation. Curve A corresponds to the performance of a lamp having a phosphor coating of the phosphor of the present invention (similar to the phosphor prepared and described in Example III), the individual particles of which have been continuously coated with a nonparticulate, noncrystalline, conformal continuous alumina coating by a coating method similar to that described in detail in the foregoing example. Curve B presents data for a lamp wherein the phosphor coating comprises the phosphor of the present invention (similar to the phosphor prepared and described in Example III). Curve C is data for a fluorescent lamp having a coating of standard commercial willemite phosphor (No. 2282, obtained from the Chemical and Metallurgical Division of GTE Products Corporation, Towanda, Pa.) with an Sb$_2$O$_3$ additive which had been added to the phosphor slurry during lamp fabrication. All the lamps were evaluated at the same time in the same test series.

The lamp test data show an improved initial brightness for the phosphor of the present invention. The phosphor of the present invention shows an even more dramatically improved performance when the individual particles thereof are coated with alumina.

While there has been shown and described what are considered preferred embodiments of the present invention, it will be obvious to those skilled in the art that various changes and modifications may be made therein without departing from the invention as defined by the appended claims.

What is claimed is:

1. A method for preparing a manganese-activated zinc orthosilicate fluorescent lamp phosphor having the empirical formula:

$$Zn_{(2.00-x-y)}Mn_xSiO_{(4.00-y)}(WO_3)_z$$

wherein:
  $0.04 \leq x \leq 0.15$;
  $0 \leq y \leq 0.05$; and
  $0 \leq z \leq 0.002$,
wherein all of said manganese activator is present as manganese (II) and occupies zinc (II) sites whereby said phosphor has improved white bodied coloration and improved brightness due to the absence of unreacted manganese containing second phases which result in discoloration and reduced brightness, comprising the steps of:

blending a zinc source, a manganese (II) source, a silicon source, and a tungsten source in amounts in accordance with said formula with $NH_4Cl$ and $NH_4F$ in an amount of up to about 2 weight percent $NH_4Cl$ and up to about 0.2 weight percent $NH_4F$ to form a relatively uniform admixture, said zinc source consisting essentially of zinc oxide or zinc carbonate, said manganese source consisting essentially of manganese (II) oxide or manganese (II) carbonate, said silicon source consisting essentially of silicic acid, and said tungsten source consisting essentially of tungsten trioxide;

firing said admixture in a closed container under an inert non-oxidizing atmosphere to promote retention of manganese in the plus two valance state whereby oxidation of manganese to a higher valence state is avoided, the $NH_4Cl$ and $NH_4F$ being in an amount sufficient to purge the closed container of residual air and/or $O_2$ and the $NH_4F$ being in an amount sufficient to effect a larger size phosphor particle than said method, absent $NH_4F$, said firing comprising increasing the temperature from about 700 degrees Centigrade to about 1,250 degrees Centigrade over time period of about 30 minutes, heating the admixture at a temperature of about 1,250 degrees Centigrade for about 2 to about 3 hours, and decreasing the temperature to about 700 degrees Centigrade over a time period of about one hour to form a precursor lamp phosphor containing substantially all of said manganese in the plus two valance state and including unreacted manganese;

milling and washing said precursor lamp phosphor in an aqueous citric acid solution to remove substantially all of said unreacted manganese to form said fluorescent lamp phosphor, said citric acid solution comprises from about 0.2 to about 0.4 weight percent citric acid;

rinsing the citric acid washed lamp phosphor with ammonium hydroxide;

drying the rinsed phosphor; and sieving the dried phosphor through a 200-mesh to 400-mesh screen.

2. A method in accordance with claim 1 wherein the admixture includes from about 0.5 to about 1.0 weight percent $NH_4Cl$.

3. A method in accordance with claim 1 wherein the admixture includes from about 0.02 to about 0.06 weight percent $NH_4F$.

4. A method in accordance with claim 1 wherein the phosphor has an FSSS particle size in the range of from about 5 micrometers to about 6 micrometers.

5. A method in accordance with claim 1 wherein the phosphor has composition comprising:

a zinc concentration from about 54.06% to about 57.60% by weight;

a silicon concentration from about 12.60% to about 12.93% by weight;

a manganese concentration from about 0.98% to about 3.79% by weight; and a tungsten concentration from about 0% to about 0.169% by weight.

* * * * *